(12) United States Patent
Bousset et al.

(10) Patent No.: US 10,077,025 B2
(45) Date of Patent: Sep. 18, 2018

(54) WINDSCREEN WIPER ADAPTER WITH SAFETY POSITION

(75) Inventors: Xavier Bousset, Mezel (FR); Giuseppe Grasso, Le Breuil sur Couze (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 338 days.

(21) Appl. No.: 14/235,363

(22) PCT Filed: Jul. 27, 2012

(86) PCT No.: PCT/EP2012/003216
§ 371 (c)(1),
(2), (4) Date: May 21, 2014

(87) PCT Pub. No.: WO2013/013835
PCT Pub. Date: Jan. 31, 2013

(65) Prior Publication Data
US 2014/0338143 A1 Nov. 20, 2014

(30) Foreign Application Priority Data
Jul. 27, 2011 (FR) .................................. 11 56876

(51) Int. Cl.
*B60S 1/40* (2006.01)
*B60S 1/38* (2006.01)

(52) U.S. Cl.
CPC ............ *B60S 1/3868* (2013.01); *B60S 1/4048* (2013.01); *B60S 1/3863* (2013.01); *B60S 2001/4051* (2013.01); *B60S 2001/4054* (2013.01)

(58) Field of Classification Search
CPC ........ B60S 1/40; B60S 1/4038; B60S 1/4045; B60S 1/4048; B60S 2001/4054; B60S 2001/4051

(Continued)

(56) References Cited

U.S. PATENT DOCUMENTS 6,599,051 B1 * 7/2003 Jarasson ............... B60S 1/4038
15/250.32
2006/0059647 A1 3/2006 Ostrowski

FOREIGN PATENT DOCUMENTS

DE 20 2004 012300 U1 7/2005
DE 10 2008 049272 A1 4/2010
DE 10 2009 029458 A1 3/2011

OTHER PUBLICATIONS

International Search Report issued in PCT/EP2012/003216 dated Dec. 14, 2012 (4 pages).

* cited by examiner

*Primary Examiner* — Gary Graham
(74) *Attorney, Agent, or Firm* — Osha Liang LLP

(57) ABSTRACT

The invention relates to an adapter (9) for connecting a windscreen wiper blade (1) to a drive arm (3) of a wiper system, said adapter (9) being configured to be connected to a connector (8) with a degree of freedom in pivoting about an axis of articulation, said connector (8) being fixed to the blade (1), said adapter (9) comprising means for keeping in a nominal position of immobilization on the arm, said adapter (9) being configured to be immobilized, in a direction known as the direction of retraction, situated in a plane perpendicular to the axis of articulation, in a safety position, should said retaining means (20) fail. According to the invention, the adapter (9) is configured to be guided by the arm (3) in a translational movement, in said direction of retraction, from said nominal position to said safety position and/or to have a direction of deliberate disengagement from the arm starting from a position located between the two, nominal and safety positions. The invention also relates to an attachment device and to a wiper system comprising such an adapter.

13 Claims, 6 Drawing Sheets

(58) Field of Classification Search
USPC .................................................. 15/250.32
See application file for complete search history.

WINDSCREEN WIPER ADAPTER WITH SAFETY POSITION

The field of the present invention is that of vehicle equipment and more particularly that of the equipment for wiping automotive vehicle windshields.

Motor vehicles are commonly fitted with wiper systems to clear the windshield and prevent the driver's view of surroundings being impaired. These wipers conventionally comprise a driving arm, which moves angularly back and forth, and elongate blades, themselves bearing blade rubbers made of an elastic material. These blade rubbers rub against the windshield and remove the water by clearing it away from the driver's field of view. The blades are produced in the form either, in a conventional version, of articulated frames which hold the blade rubber at several discrete points, conferring upon it a curvature that allows it to hug any curvature of the windshield, or, in a more recent version referred to as "flat blade", of a semi-rigid assembly which holds the blade rubber along its entire length, using one or more bending backbones that allow the blade to be pressed against the windshield without the need to use frames.

In both solutions, the blade is attached to the rotary wiper arm by an attachment device consisting of a connector and of an adapter. The connector is a component crimped directly onto the blade rubber or directly onto the flat blade, whereas the adapter is an intermediate component that allows the connector to be attached to the wiper arm. These two components are joined together by a transverse pivot pin that allows them relative rotation, in a plane perpendicular to the windshield passing through the arm.

Such adapters comprising one or more flexible locking studs that clip onto the arm so as to block the adapter thereon are known. However, it is appropriate to anticipate a failure, such as disengagement of the stud or studs, which carries the risk of causing undesired detachment between arm and blade.

In order to deal with this risk, adapters or connectors configured to allow the attachment device to be blocked in position in a direction situated in a plane perpendicular to the pivot pin in the event of adapter locking stud failure have already been proposed.

The invention seeks to improve the situation, particularly in terms of reliability and/or maneuverability.

To that end it proposes an adapter for connecting a wiper blade to a driving arm of a wiper system, said adapter being configured to be connected to a connector with a degree of freedom in pivoting about a pivot pin, said connector being fixed to the blade, said adapter comprising maintaining means for maintaining a nominal position of blockage on the arm, said adapter being configured to be blocked, in a direction referred to as the direction of withdrawal, situated in a plane perpendicular to the pivot pin, in a position of safety in the event of failure of said maintaining means.

According to the invention, the adapter is configured to be guided by the arm in translation in said direction of withdrawal from said nominal position to said position of safety and/or to have a direction of deliberate disengagement of the arm from a position situated between the nominal and safety two positions.

"Guided" means that the only degree of freedom between the arm and the adapter is the translation in said direction of withdrawal. Thanks to this guidance, accidental pulling-out of the blade once the adapter has left its nominal position is avoided.

Moreover, by defining a direction of disengagement of the arm, manipulation of the various parts of the wiper system during deliberate dismantling operations is encouraged.

The invention will find a notable application as an adapter for blades with bending backbones, or "flat blades".

Said adapter comprises, for example, a stop, referred to as a safety stop, for the position of safety. Advantageously, this stop is formed by a single stop surface.

According to a first aspect of the invention, said adapter is configured so that during the transition from the nominal position to the position of safety, an arm comprising means for the translational guidance of the arm on the adapter in said direction of withdrawal, come into contact with the safety stop.

The means that guide the translational movement of the arm are thus given a dual role, namely a first function of providing translational guidance, following failure of the maintaining means, and a second function of acting as a stop in the position of safety by coming into contact with the stop provided on the adapter.

That way, the need for specific cutouts, which are provided on the arms of the prior art and which make the arms more complicated to manufacture, is avoided. Specifically, such cutouts entail manufacturing the arm with a higher degree of precision than the standard degree of precision otherwise used for this component.

According to a second aspect of the invention, which may be combined with the first, the adapter comprises lateral flanges where said connector is articulated, said adapter defining, between said lateral flanges, a housing for part of the connector accommodating said pivot pin, at least one of said lateral flanges comprising an exterior wall configured to guide the arm in translational movement in a direction situated in the plane perpendicular to the pivot pin, and a rear wall situated laterally set back from said exterior wall, said safety stop extending laterally outward from said rear wall.

"Laterally" means in the direction of said pivot pin. "Laterally set back" means toward the inside of the adapter, i.e. toward the housing for the connector.

Such a solution allows the provision of a blockage in the position of safety while at the same time encouraging the guiding of the adapter in the arm, notably at the time of fitting. Specifically, unlike in the prior art, there is no longer any need to reduce the length of arm devoted to guiding or to have to depend on the connector and in particular its size to perform this function.

It will also be noted that this second aspect of the invention can be beneficial without the adapter necessarily having to have the guidance characteristics, in the above-mentioned cases of failure of the maintaining means or of orientation in a direction of disengagement.

In other words, the invention also relates to an adapter for connecting a wiper blade to a driving arm of a wiper system, said adapter being configured to be connected to a connector with a degree of freedom in pivoting about a pivot pin, said connector being attached to the blade, said adapter comprising maintaining means for maintaining a nominal position of blockage on the arm, said adapter being configured to be blocked, in a direction referred to as the direction of withdrawal, situated in a plane perpendicular to the pivot pin, in a position of safety in the event of failure of said maintaining means, the adapter comprising lateral flanges where said connector is articulated, said adapter defining, between said lateral flanges, a housing for part of the connector accommodating said pivot pin, at least one of said lateral flanges comprising an exterior wall configured to guide the arm in translational movement in a direction situated in the plane perpendicular to the pivot pin, while the adapter is being fitted to the arm, and a rear wall situated laterally set back from said exterior wall, a safety stop for the position of safety extending laterally outward from said rear wall.

The invention also relates to an adapter for connecting a wiper blade to a driving arm of a wiper system, said adapter being configured to be connected to a connector with a degree of freedom in pivoting about a pivot pin, said adapter comprising maintaining means for maintaining a nominal position of blockage on the arm, said adapter being configured to be blocked, in a direction referred to as the direction of withdrawal, situated in a plane perpendicular to the pivot pin, in a position of safety in the event of failure of said maintaining means, the adapter comprising at least one lateral flange delimited by at least one exterior wall configured to guide the arm in translation, in the direction of withdrawal, and a rear wall situated set back from said exterior wall, a safety stop for the position of safety extending laterally outward from said rear wall, the safety stop being situated a distance from the end of the ramp in the direction of withdrawal.

According to various embodiments of these aspects of the invention, which may be considered together or separately:
- the arm comprises a support yoke intended to be connected to said adapter,
- the connector is formed by two symmetric cheeks joined together and engaging on the blade at the backbones of said blade,
- the connector and the adapter are configured to accept one and the same transverse pin, said transverse pin constituting said pivot pin,
- the adapter, on the exterior walls of its lateral flanges, has surfaces forming projections that constitute the only surfaces of contact between the adapter and the lateral faces of the yoke. For preference, this adapter has two projection-forming surfaces per lateral face, these being arranged respectively facing the projection-forming surfaces of the lateral face opposite belonging to the yoke,
- said pivot pin is formed of a transverse pin, said transverse pin being configured so that it extends substantially as far as the exterior walls of the lateral flanges of the adapter,
- the adapter is configured so that the means of translational guidance, in said direction of withdrawal, also act as a positioning stop for the nominal position,
- said arm has means of translational guidance of the arm on the adapter,
- as said means of translational guidance of the arm on said adapter are produced in the form of guideways provided on lateral faces of the arm, said safety stop is positioned so that said guideways come into contact with said safety stop in the event of failure of said maintaining means,
- said adapter has lower edges intended to collaborate with said guideways, said lower edges being situated substantially in the region of the exterior walls forming the lateral flanges of the adapter,
- said guideways cover more or less the entire surface of said lower edges, preferably only the surface of said lower edges,
- the adapter has a setting stop with which a forward longitudinal end of one of said guideways comes into contact in the nominal position,
- the forward and rear longitudinal ends of said guideways have a shape that substantially complements said setting stop and said safety stop respectively,
- said safety stop, setting stop and guideways have substantially equal heights,
- said safety stop, setting stop and guideways are situated substantially in the same plane,
- the housing of the adapter has a greater height than the part of the connector it accommodates, the height of the connector decreasing gradually from its center toward its longitudinal ends, the adapter being able, in the nominal position, to pivot about the pivot pin without coming into contact with the upper face of the connector,
- the amplitude of pivoting of the connector in the nominal position is limited only by the adapter or the guideways coming into abutment with the external wall of the grooves of the connector,
- the adapter comprises an arm disengagement ramp connecting said exterior wall and said rear wall,
- said disengagement ramp has a substantially rectilinear form,
- said ramp does not overlap said safety stop in said direction of withdrawal,
- said disengagement ramp extends from a low point situated at one of said lower edges of the adapter intended to collaborate with said guideways as far as a high point situated near the center of said rear wall,
- the distance separating said ramp from said safety stop is comprised between 0.5 and 3 cm, preferably between 0.6 and 2 cm, more preferably between 0.6 and 1.5 cm, and is more preferably still, around 1 cm. For example 0.9 cm,
- the adapter comprises at least one lower edge situated substantially level with said exterior wall forming the lateral flanges of the adapter, said disengagement ramp extending from a low point situated level with said lower edge of the adapter, the distance separating said low point from said safety stop being comprised between 1.5 and 4 cm, preferably between 2 and 3 cm,
- the safety stop is situated at a rear end of said rear wall,
- the adapter comprises a front face and a rear face which are opposite one another each comprising a slot for the passage of the blade, particularly of a deflector of the blade,
- the adapter comprises a second safety stop, the slot borne by the rear face of said adapter extending in a direction concurrent with a plane which comprises the two safety stops of the adapter and which is substantially perpendicular to said direction of withdrawal,
- the adapter is configured to allow a distal end of the yoke of the arm to be introduced onto the adapter at said rear wall before the yoke comes into contact with the exterior wall and with the ramp in order to get to its nominal position of blockage,
- said maintaining means consist of a flexible stud provided on an upper face of said adapter, said flexible stud comprising an upper face and a front face, said upper face and front face of said flexible stud being connected by a sharp edge,
- said flexible stud comprises a rear face opposite to its front face and connected to its upper face by means able to make it easier to introduce a yoke of the arm,
- the adapter is able to collaborate with an arm comprising means of translational guidance on the adapter in said direction of withdrawal, said guidance means coming into contact with the safety stop, said means of translational guidance, in said direction of withdrawal, also serving when mounting the arm (3) on the adapter and/or contributing to holding the arm on the adapter during the transition from the nominal position to the position of safety, said means of translational guidance, in said direction of withdrawal, also serving when mounting the arm on the adapter and/or contributing to holding the arm on the adapter in the nominal position.

The invention also relates to a wiper blade connector intended to be pivot mounted on an adapter as described above.

The invention also relates to an attachment device comprising such a connector and such an adapter.

The invention also relates to a wiper system arm intended to be connected to such an adapter or to such an attachment system.

Said arm comprises, for example, a support yoke intended to be connected to said adapter and/or to said attachment system.

According to one preferred embodiment, said yoke comprising lateral faces and guideways provided at said lateral faces, said guideways being formed respectively by a single bend of said lateral faces of the arm, each guideway extending toward the inside of the arm, preferably at an angle substantially equal to 90° with respect to said lateral faces.

According to another preferred embodiment, said guideways are able to hold said arm on the adapter in the vertical direction, said guideways covering only the surface of said lower edges situated substantially at the exterior walls forming the lateral flanges of the adapter.

According to yet another embodiment, said guideways have a length less than or equal to the distance separating the low point of the ramp to the safety stop, preferably strictly less than that distance, for example by 5 to 20%.

The invention also relates to a wiper system comprising such an arm and such an attachment device.

The invention will be better understood and further objects, details, features and advantages thereof will become more clearly apparent during the course of the detailed explanatory description which will follow, of one embodiment of the invention given by way of purely illustrative and nonlimiting example, with reference to the attached schematic drawings.

In these drawings:

FIG. 1 is a perspective view of one embodiment of a wiper system according to the invention, the arm being illustrated only in the region of its yoke, FIG. 2 is a detailed view of FIG. 1, showing only the blade and the connector, FIG. 3 repeats FIG. 2, also showing the adapter, FIG. 4 repeats FIG. 3, also showing the yoke of the arm, FIG. 5 is a perspective view from beneath of the yoke of FIGS. 1 and 4;

Figure 1:
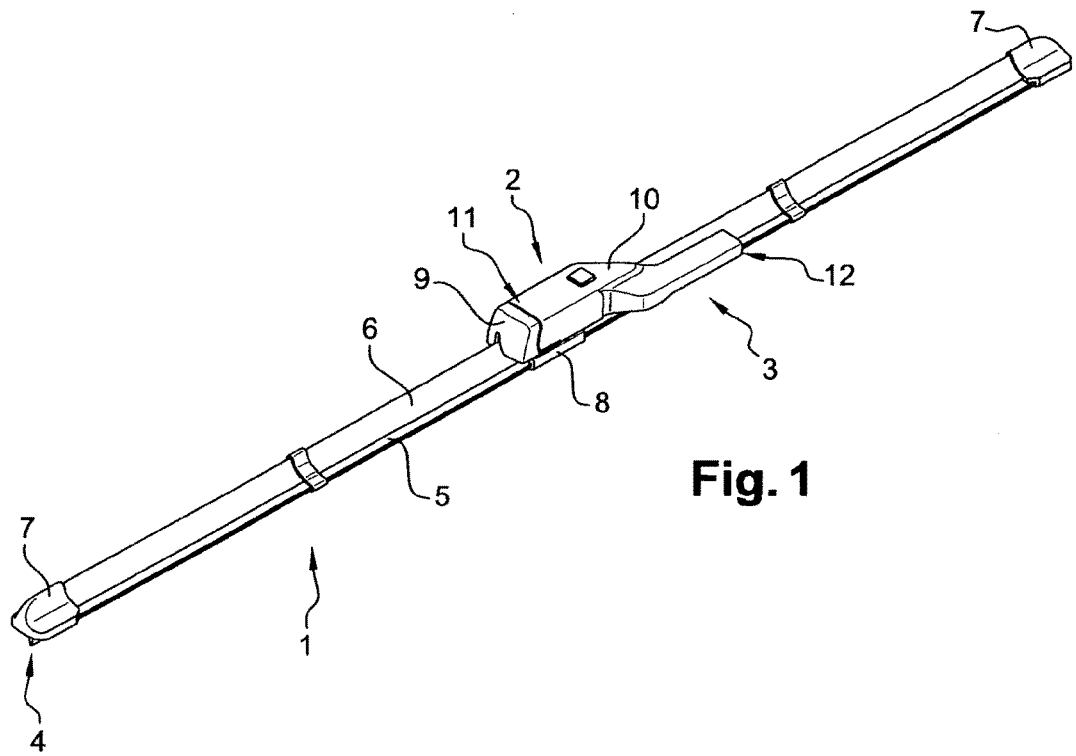

With reference to FIG. 1, the invention relates to a wiper or windshield wiper system comprising a blade 1, an attachment device 2 and an arm 3 connected to the blade 1 by the attachment device 2.

The blade 1 here comprises a body equipped with a blade rubber 4 and with one or more backbones 5 that give the blade a curvature that allows it to press correctly against the windshield. It also comprises a deflector 6 and/or end pieces 7 connecting it all together.

The attachment device 2 comprises a connector 8 and an adapter 9.

The arm 3 here comprises a support yoke 10, intended to be connected to said attachment device 2, particularly to the adapter 9, by a distal end 11. Said yoke 10 has a proximal end 12 attached to a rod, not illustrated, of the arm 3, for example by crimping.

Figure 2:
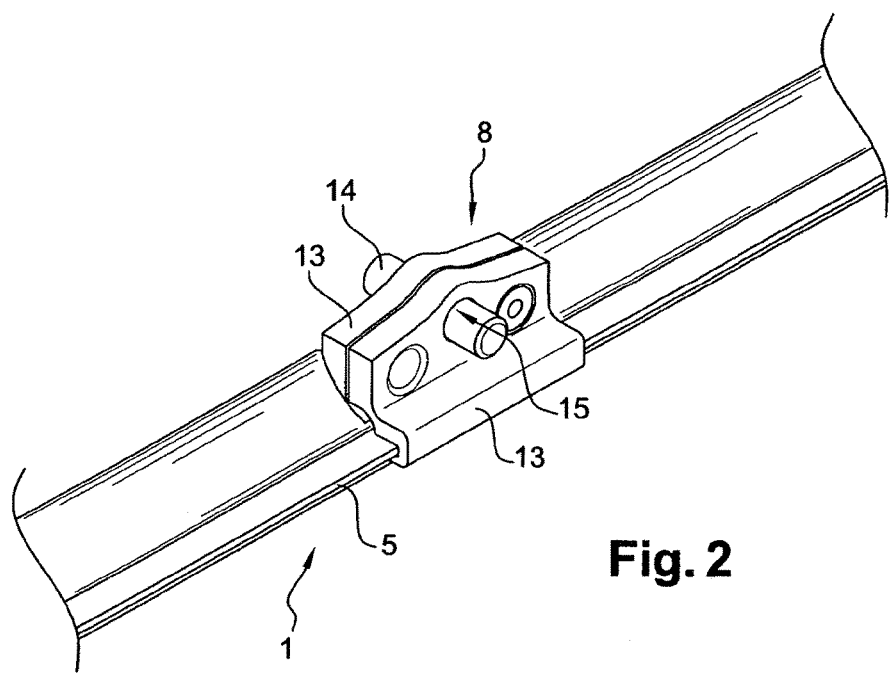
Figure 7:
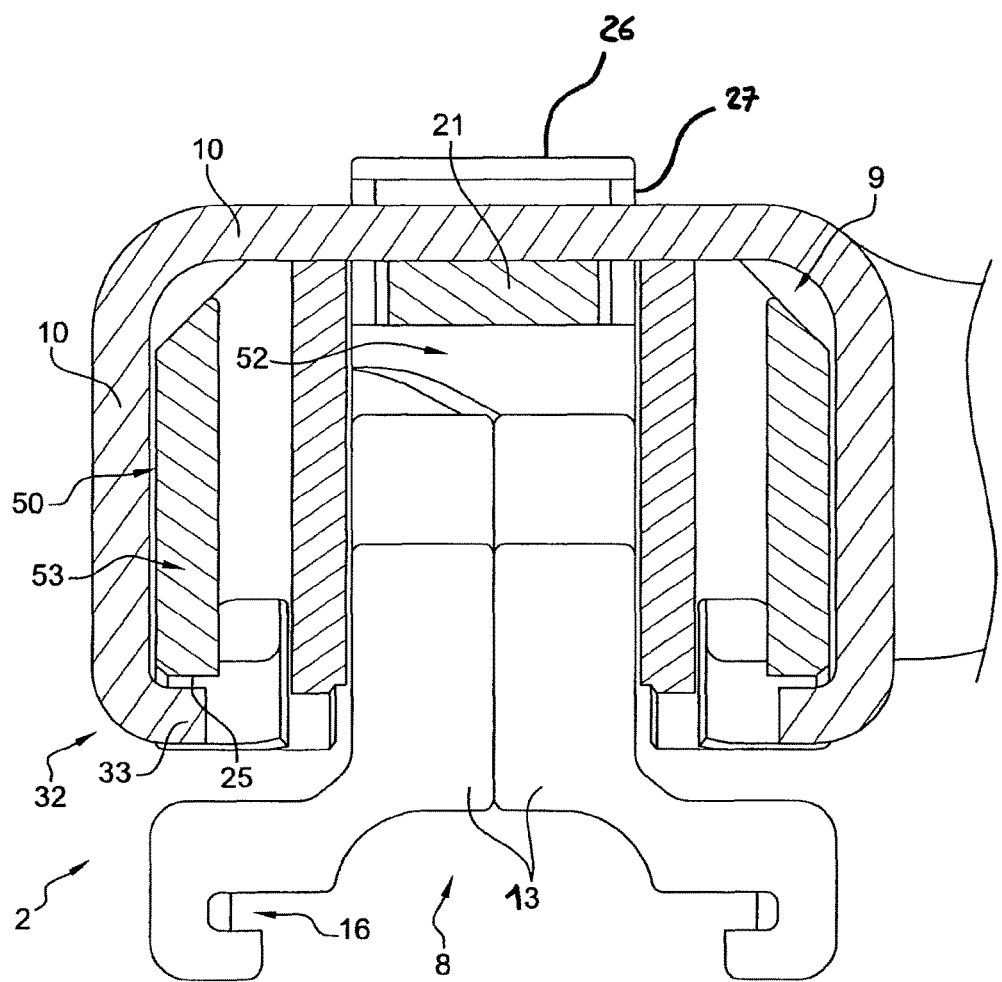
FIG. 7 is a view in cross section of the attachment device and of the yoke of the preceding figure.

As illustrated in FIGS. 2 and 7, the connector 8 is attached to the blade. What that means is that it is connected to the blade with no degree of freedom.

It has, for example, two cheeks 13 which are symmetric and joined together, sandwiching the blade 1, here in the region of the backbones 5 of said blade 1. Said cheeks 13 each for that purpose comprise a groove 16 in which said backbones are housed, these grooves being situated in a lower part of the connector 8.

Said connector 8 is intended to be pivot mounted on the adapter. For this purpose it accommodates a pivot pin 14, which here passes through the cheeks 13 at an orifice 15 situated in an upper part of the connector 8. Said pivot pin 14 is intended to be oriented in a direction orthogonal to the blade 1, in a plane tangential to the windshield.

As illustrated in FIG. 2, the connector 8 has a nonplanar upper face the longitudinal ends of which extend linearly and upward to near the center of the connector, where said upper face then follows the curved shape of the transverse pin that constitutes the pivot pin 14. Because the height of the connector 8 decreases gradually from its center toward its longitudinal ends, this makes sure that, as the adapter 9 rotates about the pivot pin 14 in the nominal position, the upper face of the connector 8 never comes into abutment with the adapter 9. Thus, in the nominal position, the amplitude of pivoting will be limited only by the adapter 9 or the guideways 33 coming into abutment with the outer wall of the grooves 16 of the connector 8.

Figure 3:
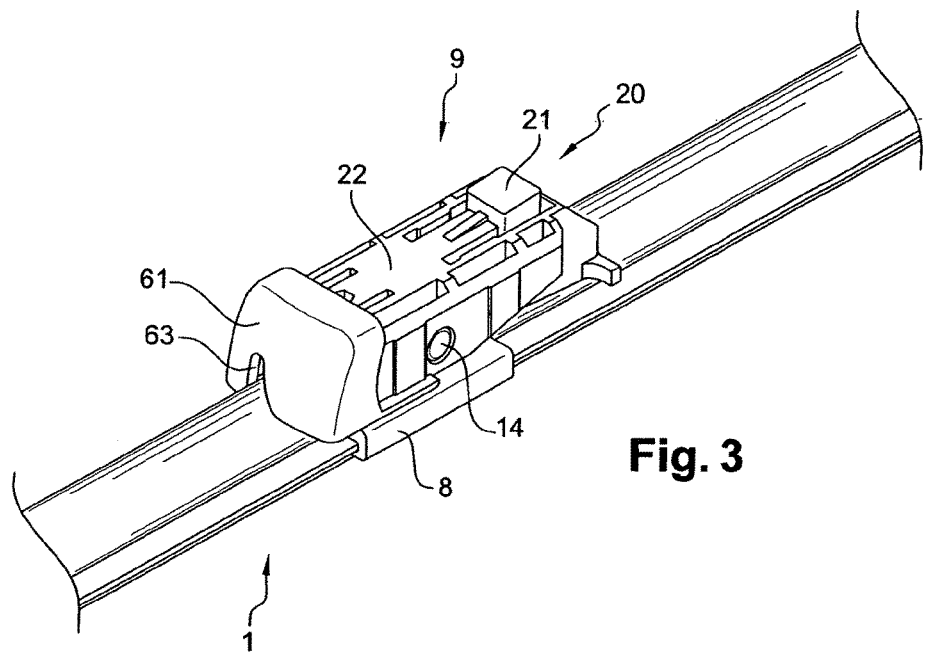
Figure 6:
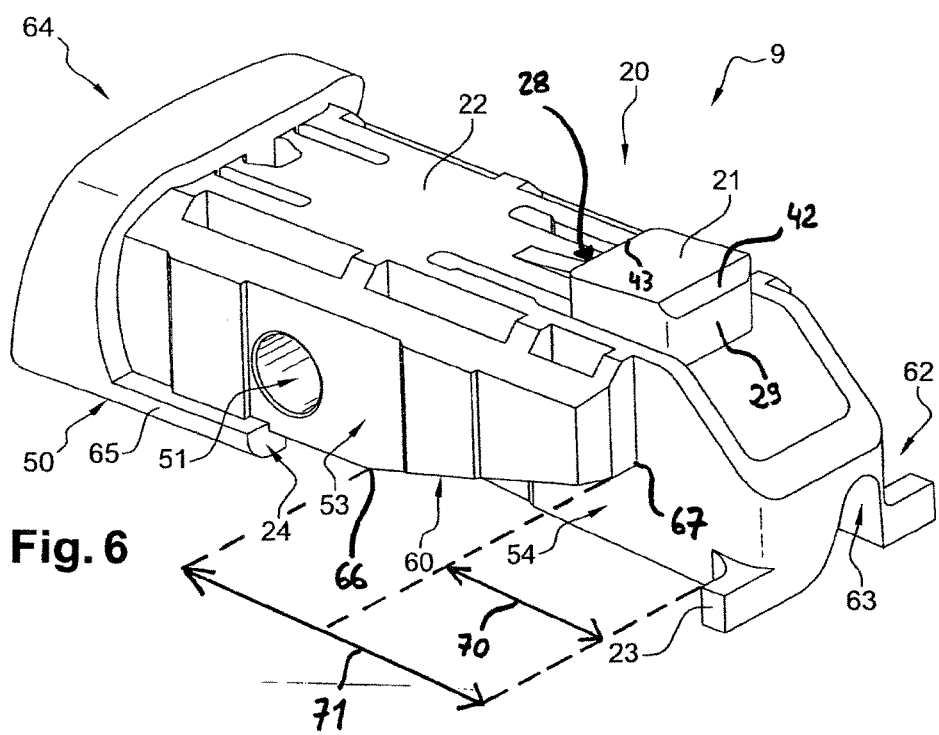
FIG. 6 is a perspective view from above of the adapter of FIGS. 1, 3 and 4.

As illustrated in FIGS. 3, 6 and 7, the adapter 9 is configured to be connected to the connector 8 with a degree of freedom to pivot about the pivot pin 14.

Figure 4:
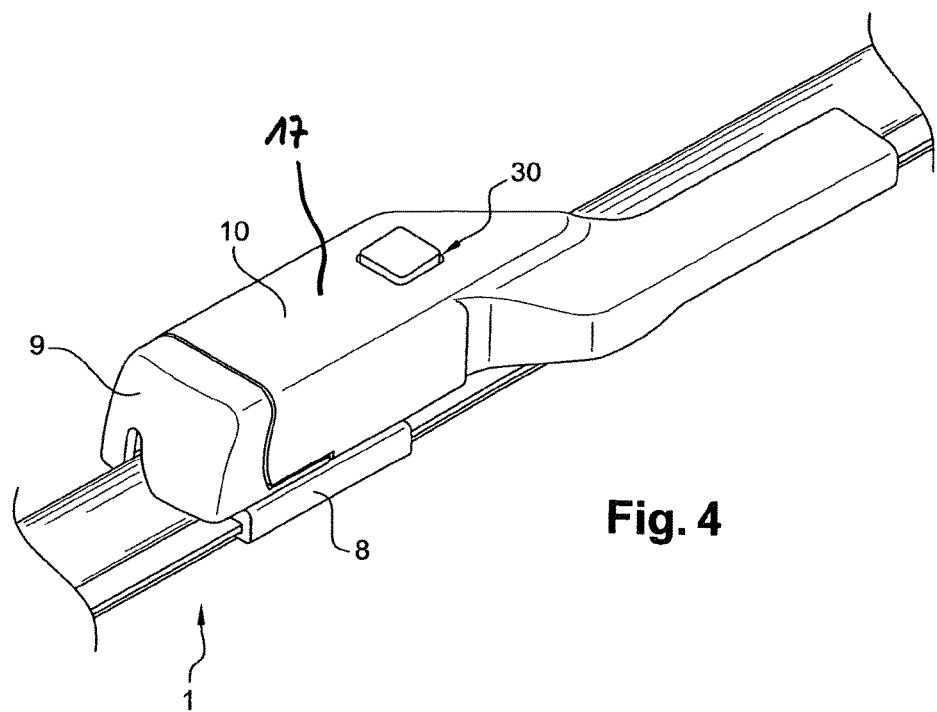
Figure 5:
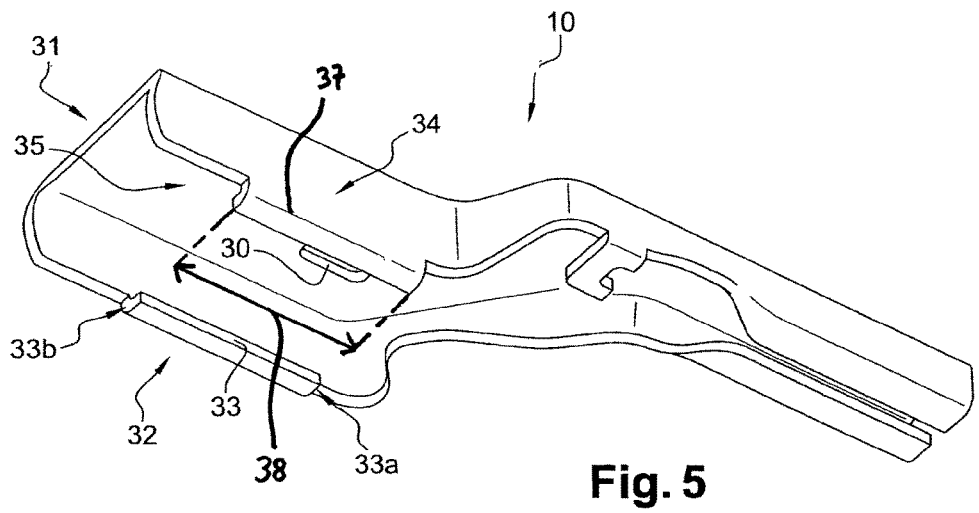

As illustrated in FIGS. 4, 5 and 7, the yoke 10 of the arm here comprises on its upper face 17 an aperture 30 of a shape that complements that of the stud 21. When the adapter 9 is being mounted in the arm 3, said stud 21 becomes lodged in the aperture 30 thus locking the blade 1 to the arm 3, in said nominal maintained position.

The adapter 9 here is supposed to be inserted into the yoke 10 in a translational movement performed in a plane perpendicular to the pivot pin 14 so as to arrive in said nominal maintained position. The yoke 10 is for that purpose provided with a distal opening 31 and the adapter 9 is configured to be introduced into said distal opening 31. The stud 21 is then in a retracted position until it reaches the aperture 30 in which it then engages, reversibly.

Figure 8A:
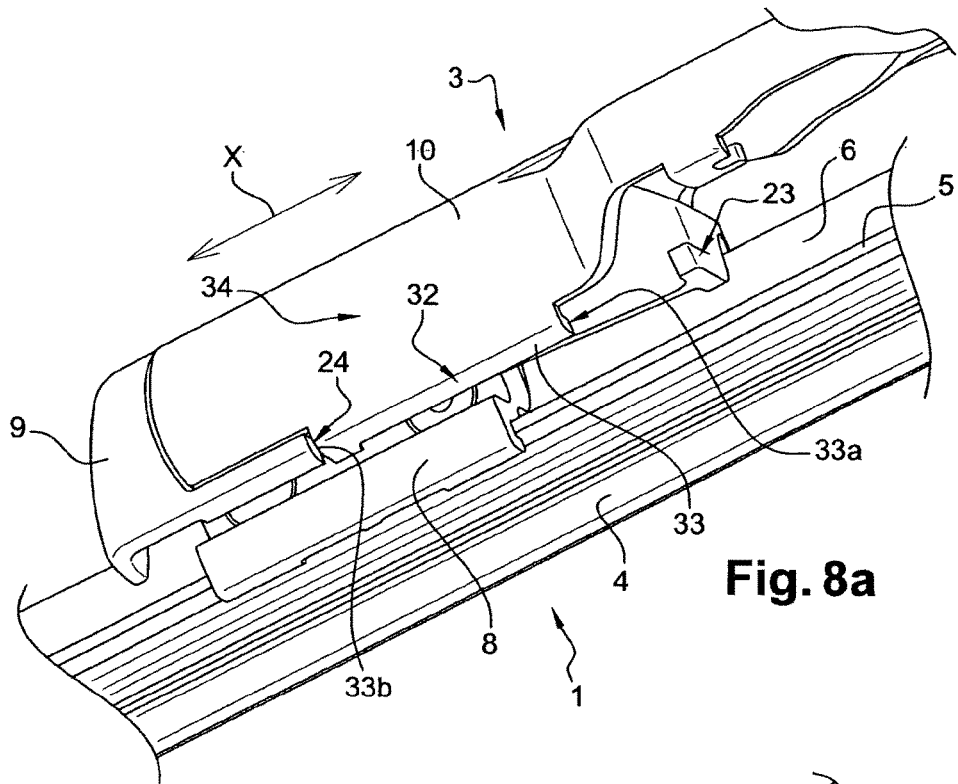
FIGS. 8a to 8d are perspective illustrations of various positions of the attachment device and of the yoke of the preceding figures.
Figure 8B:
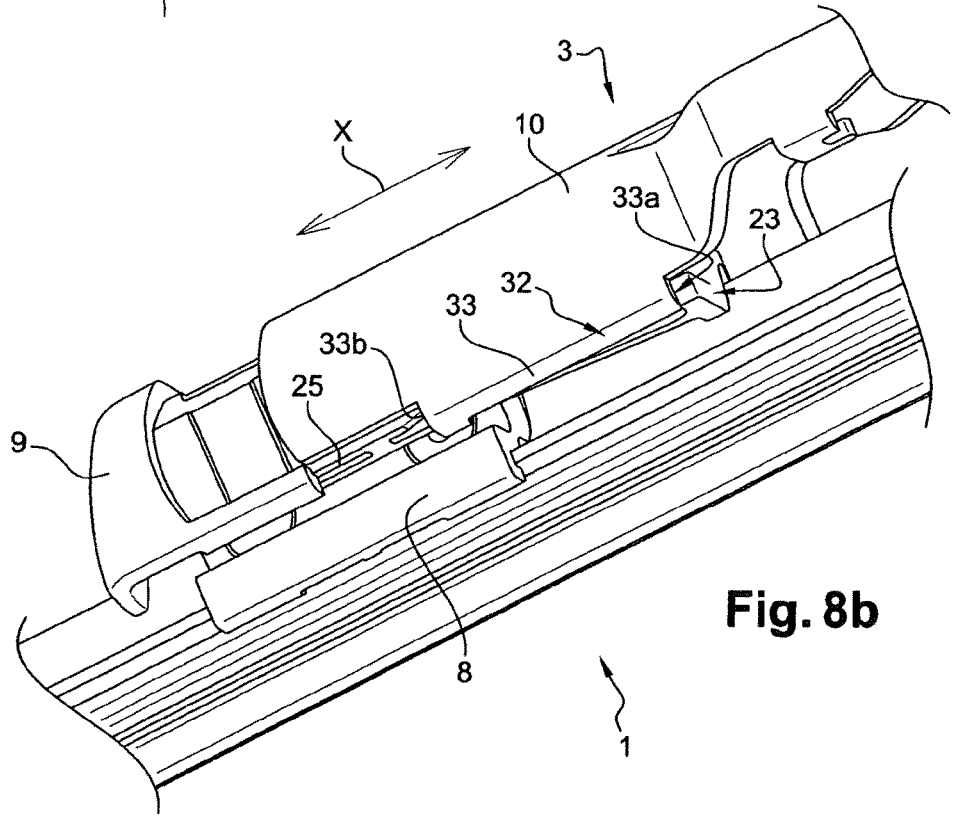

As illustrated in FIGS. 8a and 8b, said adapter 9 is configured to be blocked, in a direction referred to as the direction of withdrawal that lies in a plane perpendicular to the pivot pin, in a position of safety, in the event of failure of said maintaining means.

According to the invention, said adapter 9 is also configured to be guided by the arm 3 translationally, in said direction of withdrawal, identified as X, from said nominal position illustrated in FIG. 8a, toward said position of safety illustrated in FIG. 8b.

Such guidance makes it possible to improve reliability by preventing the arm 3 and blade 1 from becoming detached when, in the event of failure of the maintaining means 20, they find themselves free to effect a translational movement between the nominal position and the position of safety. Advantageously, guidance is from one position to the other. However, it could be interrupted, notably near the position of safety.

For its part, said arm 3 has, for example, guide means 32 for guiding the translational movement of the arm 3 on the adapter 9, these means being better visible in FIGS. 4, 5 and 7.

Said adapter 9 comprises, for example, a stop 23, referred to as a safety stop, for the position of safety.

Returning to FIG. 8b, it may be seen that said adapter 9 is configured here so that, as it passes from the nominal position to the position of safety, said means 32 for the translational guidance of the arm on the adapter come into contact with the safety stop 23, in said direction of withdrawal X. Said guide means 32 therefore perform a dual function of guiding and of acting as a stop.

Said adapter 9 may further be configured so that said means 32 of translational guidance in the direction X can also be used for mounting the arm 3 on the adapter 9 and/or may contribute to holding said arm 3 on said adapter 9 in the nominal position. Said means 32 of translational guidance are thus enriched with a third function.

As a further supplementary measure, said adapter 9 may additionally be configured so that the means 32 of translational guidance in said direction X act as a positioning stop for the nominal position. They thereby determine, as is the case in the example illustrated, the position in which the stud 21 engages in the aperture 30.

For that, the adapter has, for example, a stop 24 referred to as a setting stop.

Said means 32 for translational guidance of the arm 3 on said adapter 9 notably comprise guideways 33 facing toward one another. Said guideways 33 here consist of bent-over edges of the lateral faces 34 of said arms extending from an upper face 35 thereof, bearing said aperture 30. Said guideways 33 extend in said longitudinal direction of the arm, i.e., when the arm 3 is mounted on the attachment device 2, in said direction X.

Said safety stops 23 are then positioned so that said guideways 33 come into contact with said safety stops 23 in the event of failure of said maintaining means, particularly with a rear longitudinal end 33a of said guideways 33.

Here, said adapter 9 has lower edges 25 intended to collaborate with said guideways 33, particularly to provide translational guidance both in the event of failure of the maintaining means 20 and at the time of mounting. As illustrated in FIGS. 5 and 7, it may be seen that the guideways 33 are formed merely from a single bending-over 37 of the lateral faces 34 of the yoke 10, the guideways 33 being oriented toward the inside of the arm at an angle substantially equal to 90° with respect to said lateral faces 34. The arm 3 thus becomes particularly easy to manufacture. It may also be noted that said guideways 33 cover practically the entire surface of the lower edges 25, without extending beyond. Thus these guideways can perform all of their functions while using a minimum amount of material from which to make them. Advantageously, the length 38 of the guideways is less here than the distance separating said low point 66 of the ramp 60 to said safety stop 23.

The setting stop 24 of the adapter 9 may be positioned to come into contact a forward longitudinal end 33b of said guideways 33 at the time of fitting.

If reference is made once again to FIGS. 3, 6 and 7, it may be seen that said adapter here comprises lateral flanges 50 where said connector 8 is articulated, notably by way of an orifice 51. Said adapter 9 defines, between said lateral flanges 50, a housing 52 for part of the connector 8 accommodating said pivot pin 14. At least one, and in this instance both, of said lateral flanges 50 comprises an exterior wall 53 configured to guide the arm 3 in translation in the direction X, whether this be when the adapter is being mounted on the arm and/or in the event of failure of the maintaining means 20. It also comprises a rear wall 54, situated laterally set back from said exterior wall 53, said safety stop 23 extending laterally toward the outside from said rear wall 54.

As illustrated in FIG. 6, the wall 53 advantageously comprises surfaces forming projections constituting the only surfaces of contact between the adapter 9 and the lateral faces 34 of the yoke 10. The adapter 9 advantageously comprises two projection-forming surfaces per lateral face 34, these being arranged respectively facing those of the lateral face 34 opposite. As the transverse pin that forms the pivot pin 14 is configured so that it does not extend toward the outside of the lateral flanges of the adapter, these projection-forming surfaces ensure that friction between the yoke 10 and said pin is avoided. This then improves the rotation of the adapter 9 about the pin 14 and therefore the quality of wiping.

The rear walls 54 are, for example, parallel to the exterior walls and/or extend rearward, i.e. toward the proximal end of the yoke 10, in a plane perpendicular to the pivot pin 14. They are symmetric with one another. The lower edges 25 that collaborate with the guideways 33 are at said exterior walls 53.

Here, said lateral flanges 50 are connected to the upper face 22. The adapter 9 comprises two symmetric flanges 50. It has a substantially U-shaped cross section.

Figure 8C:
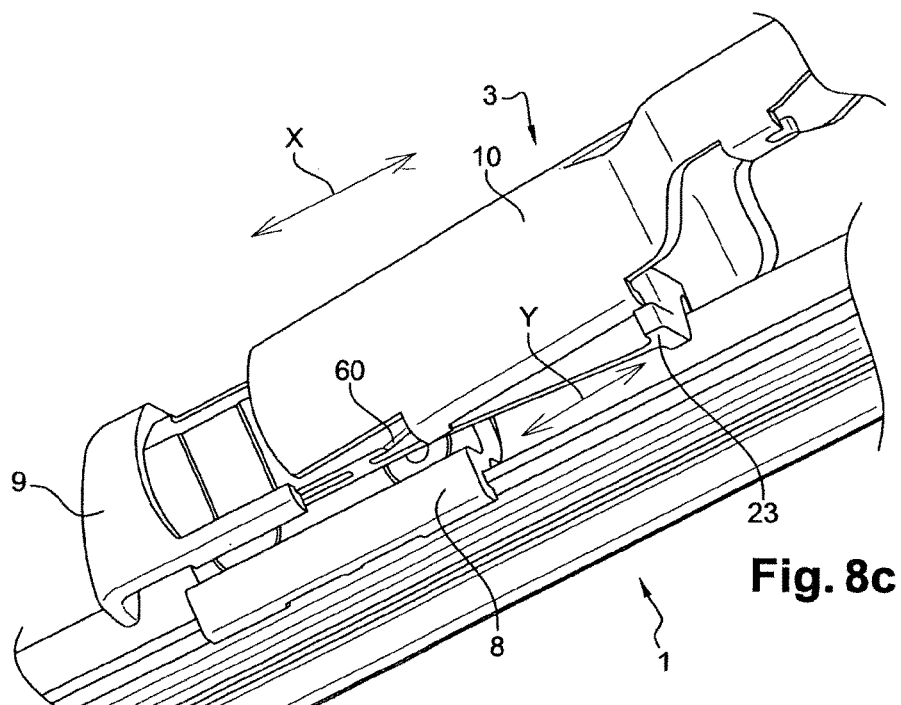
Figure 8D:
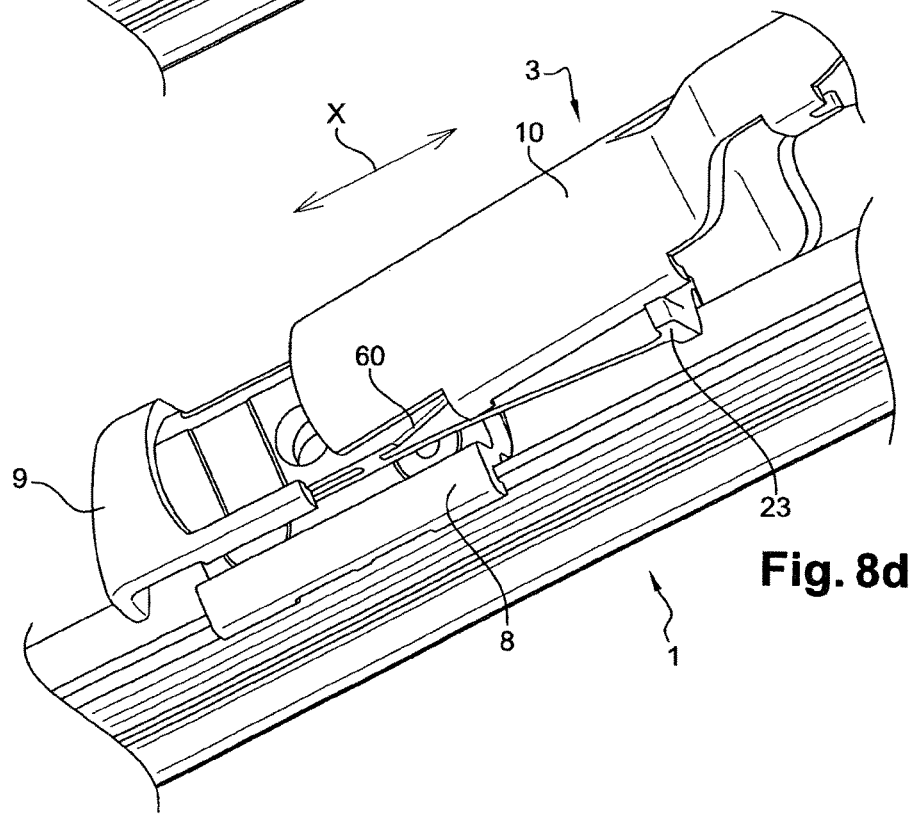

As illustrated in FIGS. 8c and 8d, the adapter 9 is also configured to have a direction, identified as Y, of deliberate disengagement of the arm 3 from a position situated between the nominal and safety two positions. This then improves the maneuverability of the whole.

In FIG. 8c it can be seen that the arm 3 has been pivoted slightly upward with respect to the adapter 9 to disengage said arm 3 from the safety stop 23.

In FIG. 8d, the movement of the arm 3 relative to the adapter 9 is lengthened. As the degree of disengagement is more advanced here, the direction Y of deliberate disengagement is no longer necessarily followed here. The direction here is angularly offset from said direction X by a few degrees.

To provide such functioning, said adapter for example comprises a ramp 60 for disengaging the arm 3, here connecting said exterior wall 53 and said rear wall 54. This ramp 60 extends from a low point 66 belonging to said exterior wall 53 to an end 67 situated on said rear wall 54.

Said safety stop 23 is situated, for example, at a rear end of said rear wall 54, notably in a lower corner thereof. What that means is a corner opposite the upper face 22 of said adapter 9.

As illustrated in FIG. 6, the ramp 60 has a substantially rectilinear shape making mounting easier. Further, it does not overhang the safety stop 23 in so far as it does not extend as far as said rear end of said rear wall 54. The safety stop 23 is therefore situated a distance 70 from the end 67 of the ramp in the direction of withdrawal.

Thus, the distal end 11 of the yoke 10 can be introduced over the adapter 9 at the rear wall 54 before the yoke 10 comes into contact with the exterior wall 53 and with the ramp 60 to arrive at its blocked nominal position.

As illustrated in FIGS. 8a to 8d, it may be noted that, here, the distance 71 separating the lowest point 66 of the ramp 60 to the stop 23 is slightly greater than the length 38 of the guideway 33. The arm 3 can thus easily be introduced onto the adapter 9 without the safety stop 23 touching the yoke 10 of the arm 3, and thus impeding this introductory movement. Introduction of the arm 3 over the adapter 9 is thus far easier.

In the example illustrated, the yoke 10 has a hollow substantially parallelpipedal shape, the front, rear and lower faces of which are open to allow the adapter 9 and the connector 8 attached thereto to pass. The lower face comprises the guideways 33 which form means of support for the adapter 9 and against which the lower edges 25 of said adapter 9 press. The adapter 9 likewise is substantially in the shape of a parallelepiped with, on its upper face 22, the retractable stud 21. The width of the adapter 9 is slightly less than the separation between the lateral faces 34 of the yoke 10 so that the adapter 9 can be inserted therein, but is greater than the separation there is between the two guideways 33, so that these guideways can carry it. The adapter 9 on opposing front 61 and rear 62 faces has slots 63 for the passage of the blade 3, particularly the blade deflector 6. The safety stops 23 are in the region of said rear face 62.

The lateral faces 34 of the yoke 10 are identical to one another, at least in their forward end part in contact with the adapter 9. The adapter 9 has a head 64, the outlines of which are intended to lie in the continuation of the yoke 10, in the nominal position, acting as a stop to translational movement in said direction X for the upper face 35 and the lateral faces 34 of said yoke 10.

Said head 64 is here extended rearward by a flat 65 which is situated along a lower edge corner of the exterior walls 53 and of which the opposite end to the head defines the setting stop 24.

Advantageously, the safety stop 23, the setting stop 24 and the guideways 33 have substantially equal heights. Further, the forward longitudinal ends 33b of the guideways 33 have a shape that more or less complements the setting stops 24 just as the rear longitudinal ends 33a of the guideways 33 have a shape that substantially complements the safety stops 23. In this way, collaboration between the forward 33b and rear 33a longitudinal ends of the guideways 33 and the corresponding safety stop 23 and setting stop 24 is optimized, while at the same time obtaining a wiper blade of satisfactory esthetic appearance.

It may be noted that the connector 8 has a dimension in longitudinal extension, namely in the direction in which the blade 1 extends, that is smaller than that of the adapter 9 so that it is concealed inside said housing 52.

Likewise and as illustrated in FIG. 7, the housing 52 has a greater height than the part of the connector 8 it accommodates, so that no part of the upper face of the latter butts against its upper face in the nominal position. The connector 8 is therefore in contact with the adapter 9 only via the lateral faces of its cheeks 13.

It should be noted that alternative forms of embodiment are of course possible. In particular, the supporting yoke 10 may be made from the same material as the rest of the arm, as a continuation thereof.

The invention claimed is:

1. A wiper system comprising:
a driving arm;
an adapter for connecting a wiper blade to the driving arm of the wiper system, said adapter being configured to be connected to a connector with a degree of freedom in pivoting about a pivot pin, said adapter comprising:
maintaining means for maintaining a nominal position of blockage on the driving arm, said adapter being configured to be blocked, in a direction referred to as the direction of withdrawal, situated in a plane perpendicular to the pivot pin, in a position of safety in the event of failure of said maintaining means;
at least one lateral flange delimited by at least one exterior wall configured to guide the driving arm in translation, in said direction of withdrawal, and a rear wall situated set back from said exterior wall, a safety stop for said position of safety extending laterally outward from said rear wall; and
a ramp for disengaging the arm connecting said exterior wall and said rear wall, the safety stop being situated a distance from an end of the ramp in the direction of withdrawal,
wherein the nominal position is distinct from the position of safety; and
an attachment device comprising the connector and the adapter articulated to said connector.

2. The wiper system as claimed in claim 1, wherein the distance separating said ramp from said safety stop is comprised between 0.5 and 3 cm.

3. The wiper system as claimed in claim 1, wherein the adapter further comprises at least one lower edge situated substantially level with said exterior wall, said disengagement ramp extending from a low point situated level with said lower edge of the adapter, the distance separating said low point from said safety stop being comprised between 1.5 and 4 cm.

4. The wiper system as claimed in claim 1, wherein the safety stop is situated at a rear end of said rear wall.

5. The wiper system as claimed in claim 1, wherein the adapter further comprises a front face and a rear face which are opposite one another each comprising a slot for the passage of a deflector of the blade.

6. The wiper system as claimed in claim 5, wherein the adapter further comprises a second safety stop, the slot borne by the rear face of said adapter extending in a direction concurrent with a plane which comprises the two safety stops of the adapter and which is substantially perpendicular to said direction of withdrawal.

7. The wiper system as claimed in claim 1, wherein said maintaining means consist of a flexible stud provided on an upper face of said adapter, said flexible stud comprising an upper face and a front face, said upper face and front face of said flexible stud being connected by a sharp edge.

8. The wiper system as claimed in claim 7, said flexible stud comprising a rear face opposite to its front face and connected to its upper face by means able to make it easier to introduce a yoke of the driving arm.

9. The wiper system as claimed in claim 1, wherein the adapter is able to collaborate with the driving arm comprising means of translational guidance on the adapter in said direction of withdrawal, said means of translational guidance coming into contact with the safety stop, said means of translational guidance, in said direction of withdrawal, also serving when mounting the driving arm on the adapter and/or contributing to holding the driving arm on the adapter during the transition from the nominal position to the position of safety.

10. The wiper system as claimed in claim 1, wherein a yoke of the driving arm comprises lateral faces and guideways provided at said lateral faces, said guideways being formed respectively by a single bend of said lateral faces of the driving arm, each guideway extending toward the inside of the driving arm at an angle substantially equal to 90° with respect to said lateral faces.

11. The wiper system as claimed in claim 10, wherein the driving arm is configured to be connected to the adapter, the adapter comprising two lower edges, in which arm said guideways are able to hold said driving arm on the adapter in the vertical direction, said guideways covering only a surface of said lower edges.

12. The wiper system as claimed in claim 11, wherein said guideways have a length less than a distance separating a low point situated level with said lower edge of the adapter from said safety stop.

13. An adapter for connecting a wiper blade to a driving arm of a wiper system, said adapter being configured to be connected to a connector with a degree of freedom in pivoting about a pivot pin, said adapter comprising:

maintaining means for maintaining a nominal position of blockage on the arm, said adapter being configured to be blocked, in a direction referred to as the direction of withdrawal, situated in a plane perpendicular to the pivot pin, in a position of safety in the event of failure of said maintaining means;

at least one lateral flange delimited by at least one exterior wall configured to guide the arm in translation, in said direction of withdrawal, and a rear wall situated set back from said exterior wall, a safety stop for said position of safety extending laterally outward from said rear wall;

a ramp for disengaging the arm connecting said exterior wall and said rear wall, the safety stop being situated a distance from an end of the ramp in the direction of withdrawal, wherein the nominal position is distinct from the position of safety;

a front face and a rear face which are opposite one another each comprising a slot for the passage of a deflector of the blade; and a second safety stop, the slot borne by the rear face of said adapter extending in a direction concurrent with a plane which comprises the two safety stops of the adapter and which is substantially perpendicular to said direction of withdrawal.

\* \* \* \* \*